No. 786,607. PATENTED APR. 4, 1905.
J. B. SECOR.
TABULATING DEVICE FOR TYPE WRITING MACHINES.
APPLICATION FILED JULY 9, 1903.
4 SHEETS—SHEET 1.
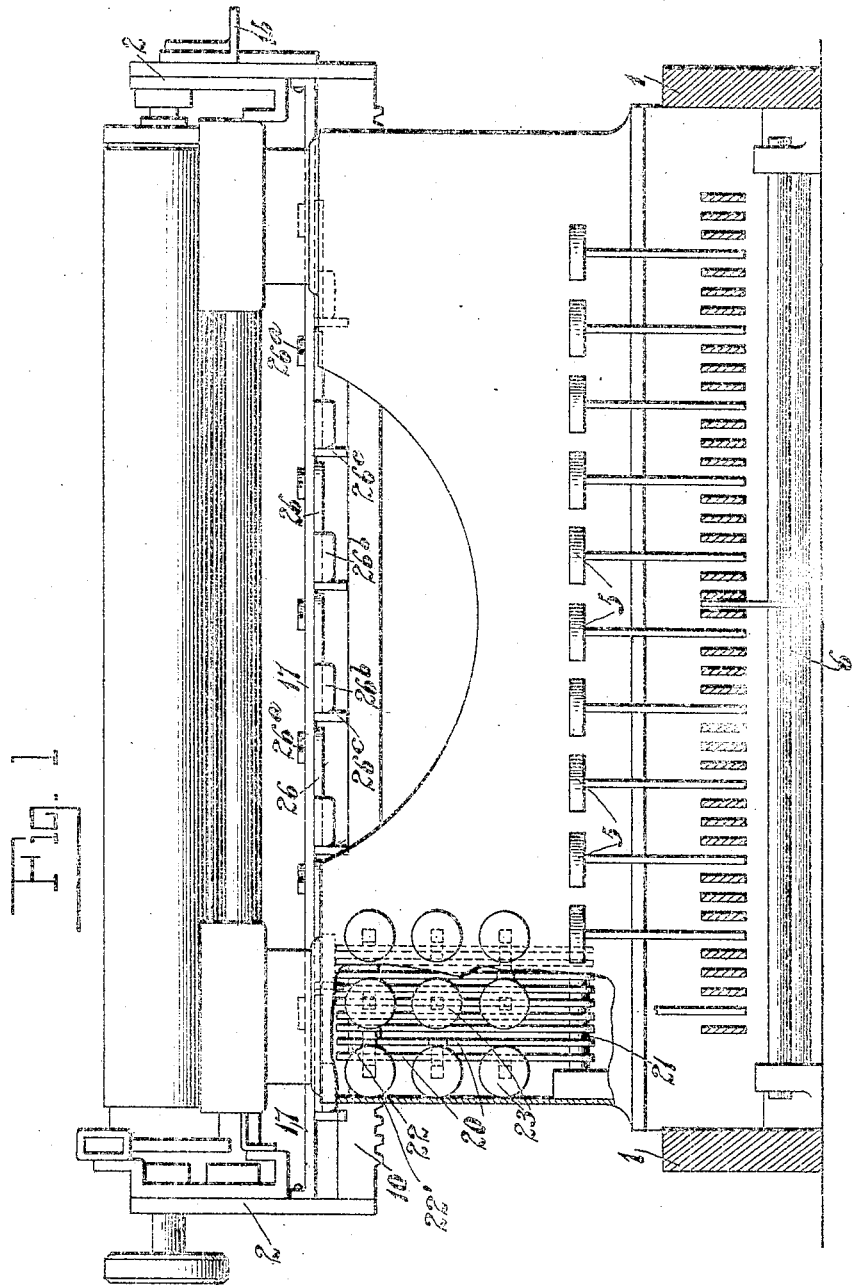

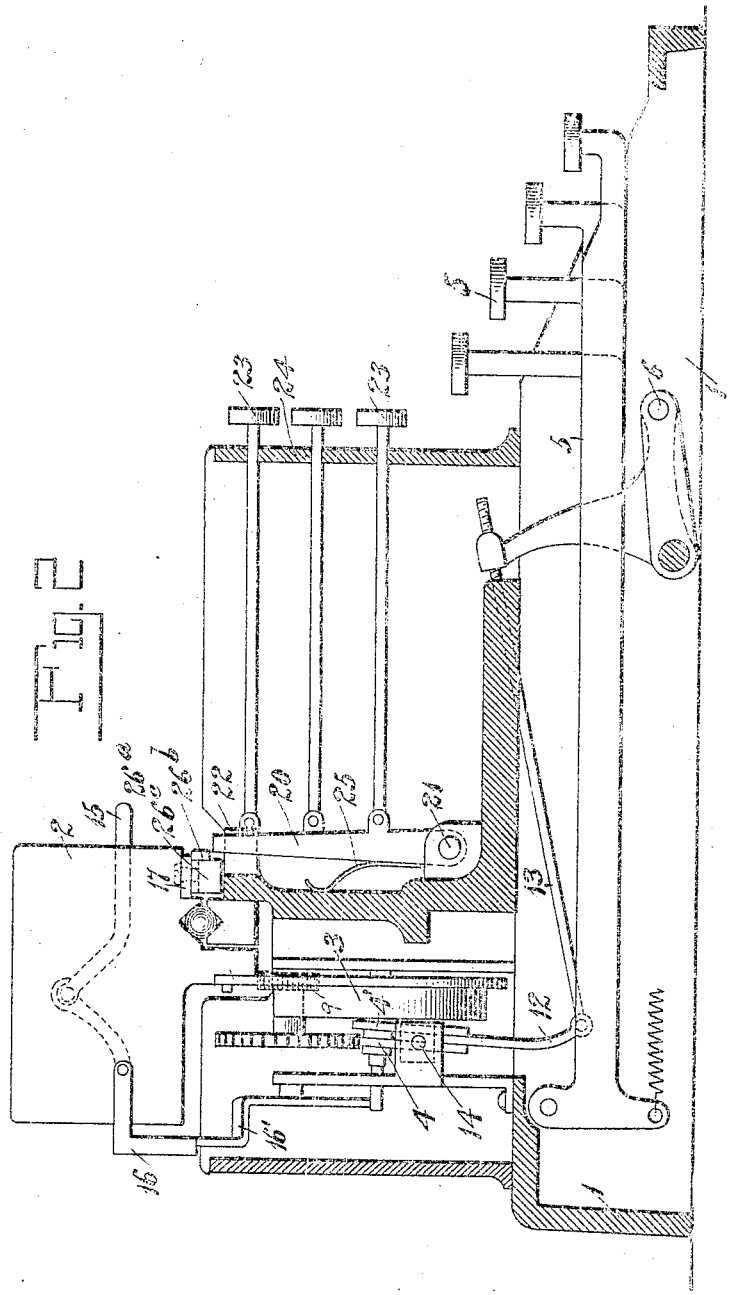

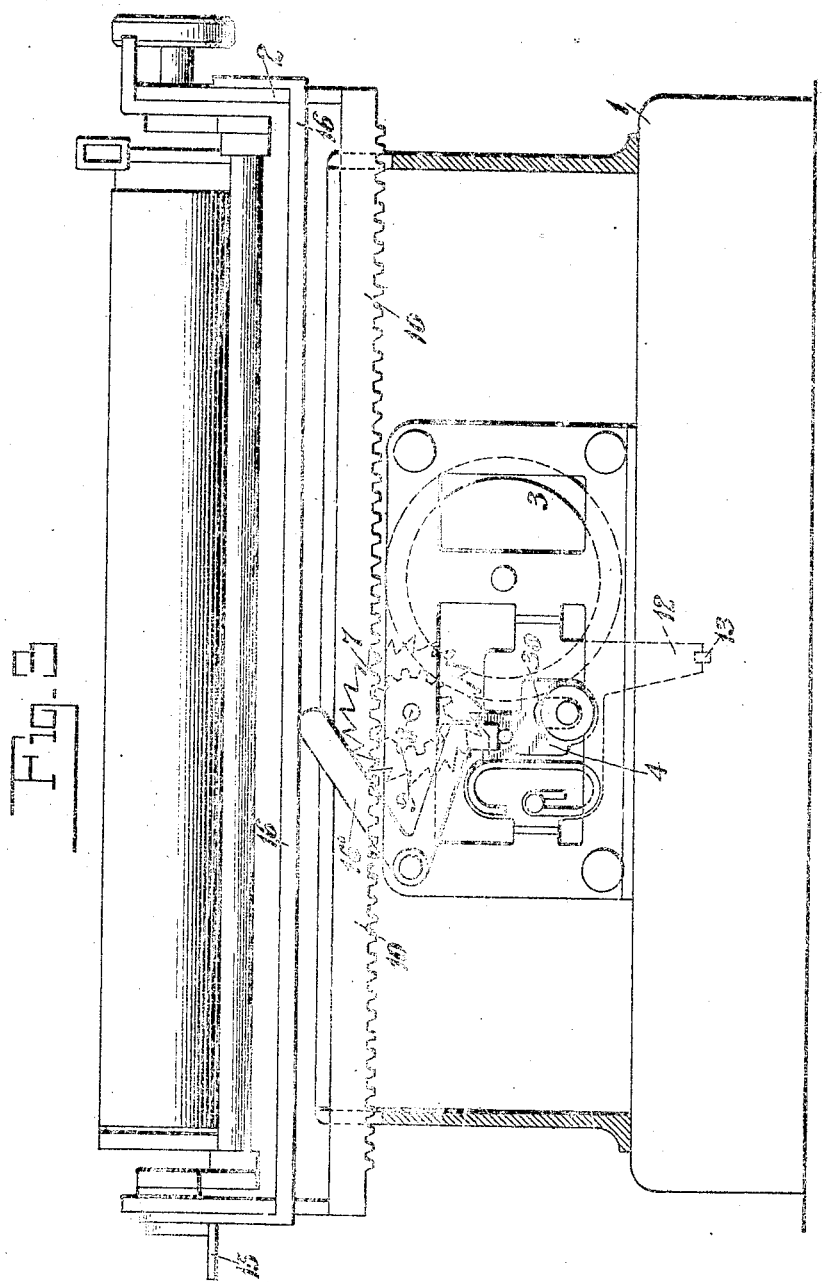

No. 726,607. PATENTED APR. 4, 1903.
J. B. SECOR.
TABULATING DEVICE FOR TYPE WRITING MACHINES.
APPLICATION FILED JULY 9, 1903.
4 SHEETS—SHEET 4.
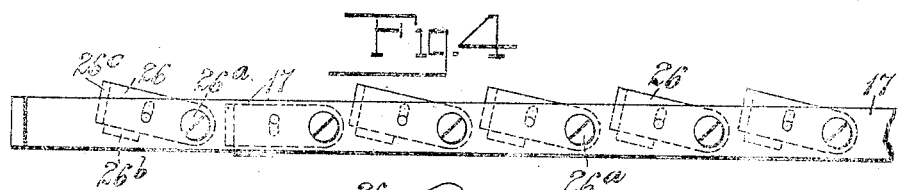
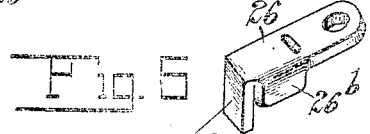
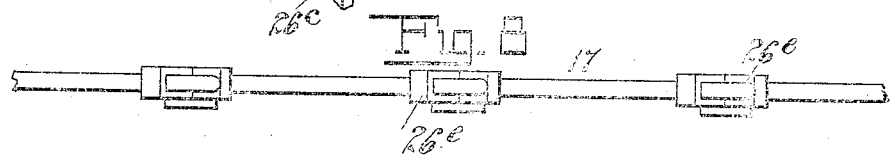
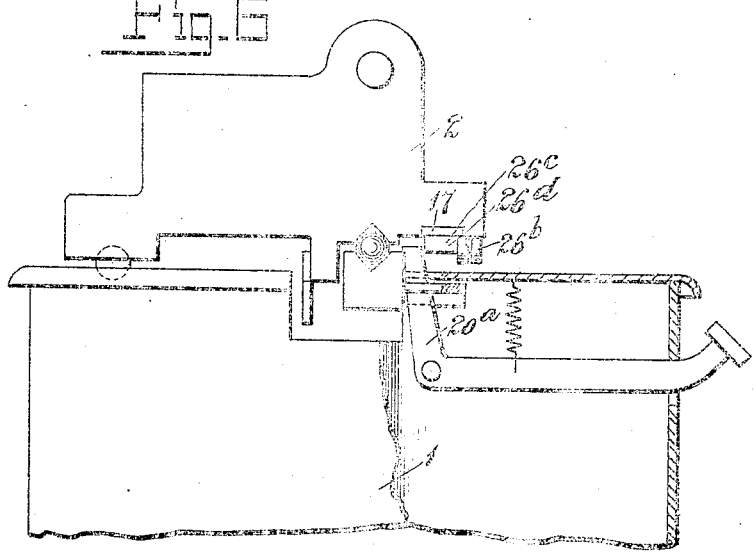
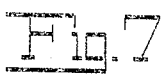

No. 786,607.

Patented April 4, 1905.

UNITED STATES PATENT OFFICE.

JEROME B. SECOR, OF DERBY, CONNECTICUT, ASSIGNOR TO THE WILLIAMS TYPEWRITER COMPANY, OF DERBY, CONNECTICUT, A CORPORATION OF IOWA.

TABULATING DEVICE FOR TYPE-WRITING MACHINES.

SPECIFICATION forming part of Letters Patent No. 786,607, dated April 4, 1905.

Application filed July 9, 1903. Serial No. 164,819.

*To all whom it may concern:*

Be it known that I, JEROME B. SECOR, a citizen of the United States, residing at Derby, in the county of New Haven and State of Connecticut, have invented certain new and useful Improvements in Tabulating Devices for Type-Writing Machines, of which the following is a specification.

This invention relates to improvements in tabulating devices for type-writing machines; and its object is to provide a tabulating stop mechanism which will serve as a column-stop and will be entirely independent in its operation of the release device for the carriage, said release device being, in fact, the ordinary device operated by a finger-piece to release the carriage from the step-by-step feed mechanism and allow it to be moved either way by hand.

The invention comprises a stop or series of stop devices mounted on the frame arranged to be movable into the path of one or more dogs mounted on the carriage. Preferably I employ a range of said dogs mounted at fixed distances apart from end to end of the carriage by pivots or otherwise, so as to adapt them to be separately slid transversely to the carriage into or out of coöperative position with relation to the stop devices on the frame. The distance between the carriage-dogs may be one inch, more or less, to provide for printing as many columns as desirable from side to side of the paper, or they may be fixed at greater or at unequal distances apart to suit the width of columns to be printed or to meet other special requirements. Normally the carriage-dogs and also the stop devices on the frame rest in retracted position, leaving the carriage free for ordinary type-writing work. When column-work is to be done, the selected carriage-dogs are set in operative position to locate the several columns and the selected stop device on the frame is moved by its key into operative relation to the carriage-dog to determine the decimal value of the first figure to be printed in the column. The operation of the stop devices is not dependent upon or connected with the operation of the release-lever. This construction has several advantages. When the operator presses a column-stop, he may at the same time with the other hand take hold of the release-lever and move the carriage or allow it to move under his control to position against the stop, thus avoiding the banging due to release by the usual type of column-stop keys. It has been proposed to avoid such banging by use of a special movable dog on the carriage; but such a construction did not provide for varying the stop-point according to denomination to be printed except by a cumbersome arrangement of multiple dogs on the carriage. My construction effects this result with a minimum of addition to the ordinary machine, no new or additional release-levers being required and no new work being brought on the usual release-lever, which performs only its usual function. Furthermore, the operator with my device need not work the release-lever at all, as he may simply press the space, dash, or other key repeatedly while holding the proper tabulating-stop until the carriage is arrested. In close-column work this is, in fact, a convenient method of operation.

Parts of my invention may be carried into effect with the use of dogs on the carriage similar to the usual marginal-stop dogs adjustable longitudinally on the carriage, as many such dogs being provided as there may be columns to be printed.

In the accompanying drawings, Figure 1 is a front view, partly broken away, of a typewriting machine provided with my tabulating device. Fig. 2 is a vertical section of said machine from front to back. Fig. 3 is a rear view of the same, showing the frame partly in section. Fig. 4 is a detail plan view of a portion of the front bar of the carriage and a series of stop-dogs mounted equidistantly thereon and adjustable back and forward on fixed pivots to set them in or out of operative position. Fig. 5 is a perspective view of one of the pivoted dogs detached. Fig. 6 is an end view, partly in section, of the carriage and upper part of the frame, showing a modified form of key-operated stop devices mounted on the frame. Fig. 7 is a detail plan view of the front bar of the carriage with dogs mounted to slide transversely thereon. Fig. 8 is a detail plan view of a portion of the horizontal rack-bar of the carriage with dogs sliding horizontally thereon and adapted to coöperate with stop devices on the frame in locating columns to be printed, as hereinafter described.

The type-writing machine to which my invention is applied may be of any usual type comprising the usual elements—namely, frame 1, carriage 2, with its actuating device or spring device 3, escapement mechanism controlling the feed of the carriage, keyboard mechanism, of which the key-levers are indicated at 5, and universal bar 6, operated by the keyboard and controlling the escapement in the usual manner. I have shown a feed-escapement consisting of a star-wheel 7 on a shaft 8, geared by pinion 9 to the carriage-rack 10, and escapement-dogs 4 4', mounted on a rocking support 12, connected by link 13 to the universal lever and bar 6. Any other feed-escapement mechanism may, however, be used. The means for releasing the carriage from the feed-escapement may also be of any usual construction, and with the particular form of escapement shown it may be adapted to separate the operative engagement of the rack with the pinion or of the star-wheel with the escapement, and in the latter case it may operate by moving the star-wheel or by moving the normally engaging dog. I have shown the last-named form, said dog (shown at 4) being mounted on the swinging support 12 by a slot-and-pin connection 30, allowing a vertical release movement in addition to the lateral rocking movement on the axis 14 of support 12 for escapement and the longitudinal rocking movement on the pin-and-slot pivot 30 in "creeping." The release-lever 15, pivoted on the carriage, operates a rocking or shiftable bar 16, also on the carriage, engaging a bell-crank lever 16', pivoted to a fixed frame part and operatively engaging with the aforesaid escapement-dog 4, so that when said lever 15 is operated it will release the dog from the star-wheel and allow the carriage to be moved freely in either direction under the control of the operator's hand applied to the release-lever.

All of the above parts are simply illustrative of a machine to which my invention may be applied, and they form no part of said invention except in combination with the tabulating device now to be described. Such tabulating device comprises a number of dogs 26, mounted on a bar 17 on the carriage, preferably at fixed distances asunder, as illustrated in Figs. 1, 4, and 7. They are here shown mounted on fixed pivots 26ª in equidistant position and adjustable backward and forward to set them in operative or inoperative position with relation to the key-operated stop devices on the machine-frame. The tabulating device further comprises one or any suitable number of stop devices 20, shown as levers pivoted to the frame at 21 and working in a comb 22 to prevent deflection in the line of movement of the carriage. Keys 23, sliding in a fixed frame-plate 24, engage these levers 20 to press them back into the path of dogs 26, and springs 25 act on said levers to press them forward out of the path of the dogs. I prefer to provide for variable arrest of the carriage at each column-stop to enable the operator to begin writing at the proper space for different denominations, and for this purpose there must be as many of the stop-levers 20 as there are denominations to be printed, the adjacent levers being separated the distance of one space or feed of the carriage.

It being understood that normally all of the stop-levers are in inoperative position, the operator can use his machine in the usual way without any interference by the tabulating device. If at any time columniation is desired, the dogs 26 are set accordingly, and for each column operation the proper denominational stop 20 is pressed with one hand, while the operator with the other hand manipulates the release-lever 15 to free the carriage and allow it to move to bring the next dog 20 into engagement with the stop, or, as above stated, the operator instead of handling the release-lever may simply work the step-by-step feed until the carriage is arrested.

Instead of using a comb, as above described, the levers 20 may be arranged side by side, each being the thickness of one space of the type-writer feed and all of them working in a cut-out space in the bridge 22', which supports them against deflection by engaging with the left-hand lever.

It is immaterial to the invention whether the equidistant dogs be pivoted or mounted to slide or whether the forward or backward adjustment of the dogs be the operative position. If the front be the operative position, said dogs will be adapted to engage with key-operated stop-levers 20, as shown in Fig. 2. I have shown in Figs. 6 and 7 dogs $26^d$, adapted to be slid backward and forward to operative or inoperative position, and a modified form of key-operated stop-levers $20^a$, mounted on the frame and adapted to be thrown forward into operative position instead of backward, as in Fig. 2. As in Figs. 1 and 2, the stop-levers $20^a$, Fig. 6, are mounted in parallel position in the machine-frame at a distance apart corresponding with one space in feed of the carriage.

In operation the proper lever is selected and thrown into coöperative relation to the carriage-dog 26 or $26^d$ to determine the decimal value of first figure printed. Each form of key-operated stop device 20 of Figs. 1 and 2 or $20^a$ of Fig. 6 is adapted to coöperate either with transversely-adjustable dogs 26, mounted at fixed distances asunder, as in Figs. 1, 4, and 7, or with the longitudinally-adjustable dogs 26ᵉ of Fig. 8. In like manner the pivoted dogs 26 shown in Fig. 5 may coöperate with stop-levers 20 shown in Fig. 2 or the stop-levers 20ᵃ of Fig. 6. Each of the said dogs is formed with a downturned lip 26ᵇ for sliding it in and out and with a projecting nose 26ᶜ to engage with the end of the stop-lever 20 or 20ᵃ. Fig. 4 shows the second dog from the left pulled forward into position to catch against the selected stop-lever 20 when this is pushed back, and thus arrest the carriage in position to print the first figure of any desired number. The other dogs are shown retracted in inoperative position. Fig. 6 shows the dog 26ᵈ next the observer pushed back to operative position ready to be engaged by the denominational stop-lever 20ᵃ.

In the use of the term "adjustable" with reference to the stop-dogs on the carriage I intend to refer to dogs of either character herein indicated adjustable on the carriage either longitudinally or transversely in a suitable manner to adapt them in coöperation with the key-operated stop devices on the frame to locate the column in the line. Stop-dogs longitudinally adjustable on the carriage are common in the art and may be used in carrying some parts of my invention into effect.

Having thus described my invention, the following is what I claim as new therein and desire to secure by Letters Patent:

1. In a tabulating mechanism for type-writing machines, the combination with the carriage, its feed mechanism and keyboard mechanism controlling said feed mechanism; of the release-lever 15 pivoted on the carriage, the rocking bar pivoted on the carriage and operated by the lever 15, the lever 16' pivoted on the frame and operated by the bar 16; the escapement-dog engaged by the lever 16' so as to release the carriage when the bar 16 is depressed; stop-dogs mounted on the carriage; and a suitable tabulating stop device on the frame operated independently of the carriage-release mechanism; whereby the operator is enabled with one hand to set the tabulating stop device to arrest the carriage in the position desired, and with the other hand to release and control the carriage in its movement to the left until so arrested.

2. In a tabulating mechanism for type-writing machines, the combination with the machine-frame, the carriage, carriage-feed mechanism and escapement mechanism controlling the carriage-feed; of column-stop dogs adjustably mounted on the carriage, key-operated denominational stops mounted on the frame and engaging with the column-stop dogs on the carriage to arrest the latter in selected denominational positions in the several columns, and a separate carriage-release device mounted on the carriage, comprising a hand-lever, a rock-bar connected to and adapted to be actuated by said hand-lever, and a bell-crank lever connected to and adapted to be depressed by said rock-bar and engaging the carriage-escapement device so as to release the carriage when so depressed, substantially as described.

3. In a tabulating mechanism for type-writing machines, the combination with the machine-frame, the carriage, and the carriage-feed mechanism, of a series of column-stops mounted on the carriage and movable thereon into and out of operative position, a series of denomination stop-levers fulcrumed by their lower ends on the machine-frame and severally movable into the path of either of the column-stops on the carriage which may be set in operative position, push-keys connected to said denomination stop-levers for moving them into such arresting position, and springs restoring the said stop-levers to normal position when released, substantially as described.

JEROME B. SECOR.

Witnesses:
C. E. BEARDSLEY,
J. P. CLARKE.